Oct. 4, 1955 — F. KOVACH — 2,719,512
POWER TRANSMITTING DEVICES
Filed March 15, 1951 — 4 Sheets-Sheet 1

Inventor
Frank Kovach
by Parker & Carter
Attorneys.

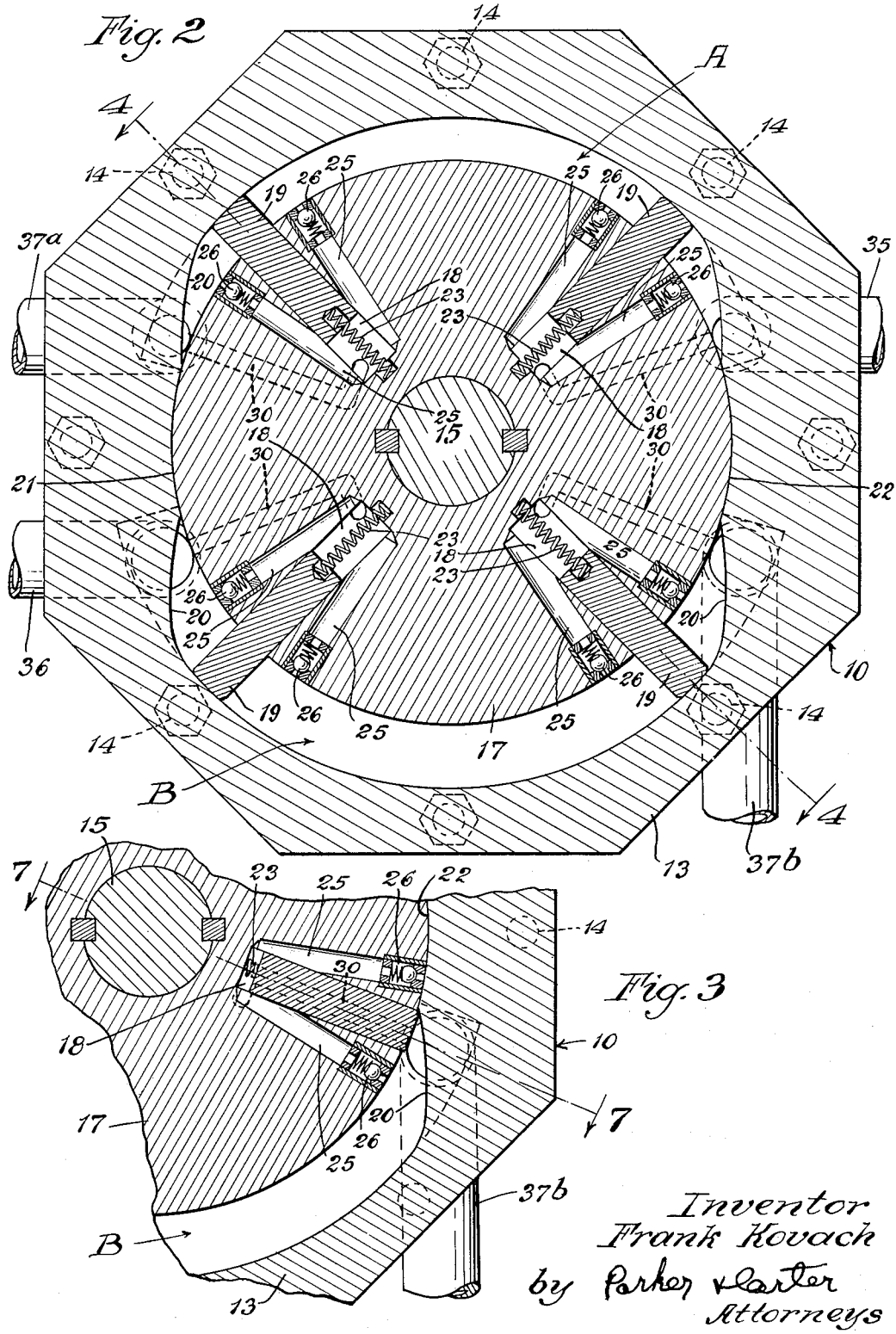

Oct. 4, 1955  F. KOVACH  2,719,512
POWER TRANSMITTING DEVICES
Filed March 15, 1951  4 Sheets-Sheet 3
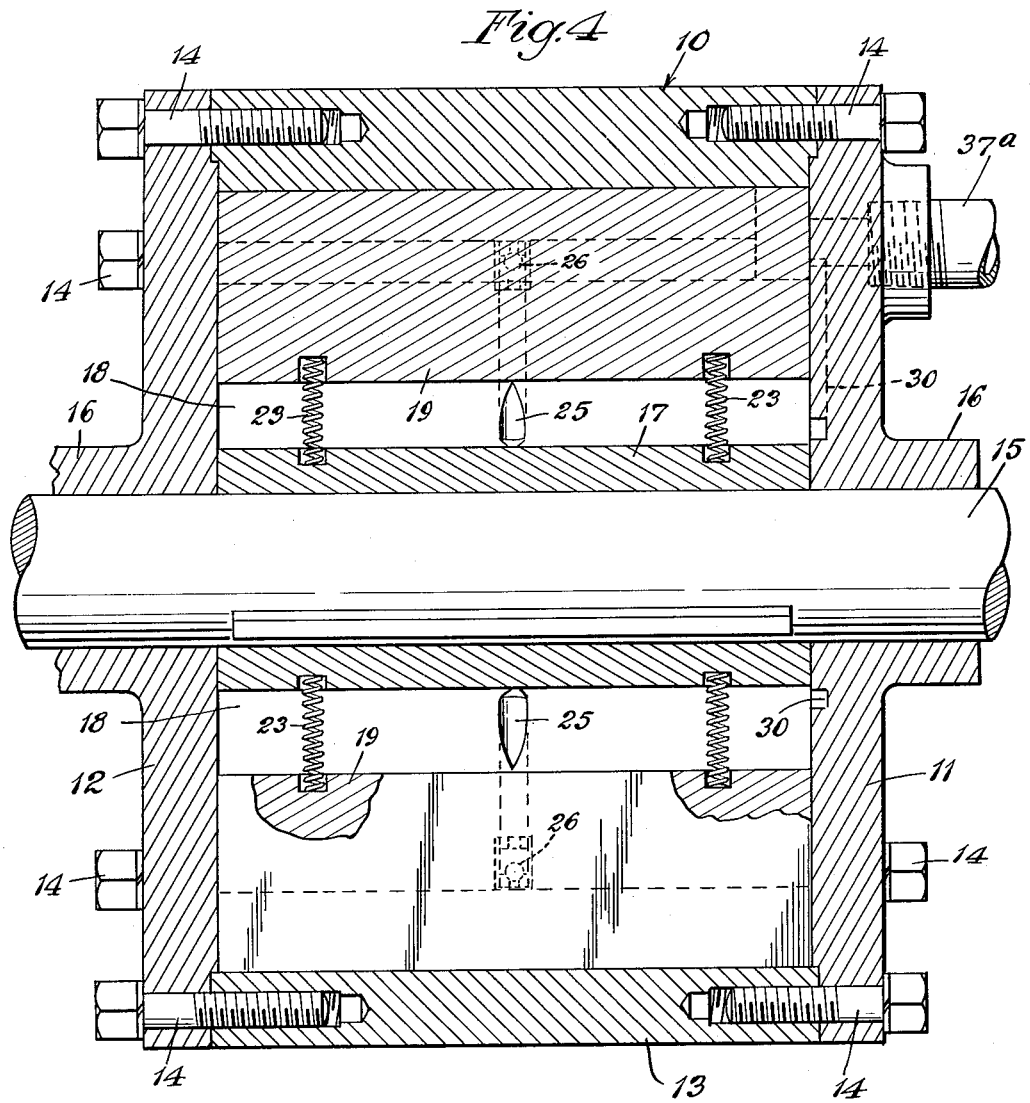
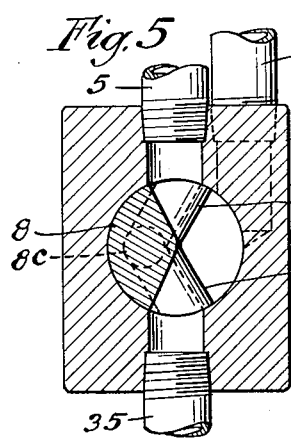 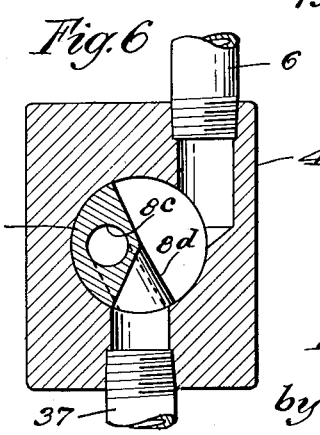
Inventor
Frank Kovach
by Parker + Carter
Attorneys Oct. 4, 1955

F. KOVACH 2,719,512

POWER TRANSMITTING DEVICES

Filed March 15, 1951

Inventor
Frank Kovach
by Parker & Carter
Attorneys

United States Patent Office 2,719,512
Patented Oct. 4, 1955

2,719,512

POWER TRANSMITTING DEVICES

Frank Kovach, Omaha, Nebr., assignor to Pixley Truck Sales Company, Omaha, Nebr., a corporation of Nebraska Application March 15, 1951, Serial No. 215,779

5 Claims. (Cl. 121—82)

My invention relates to an improvement in power transmitting devices and has for one purpose to provide an improved fluid power transmitting device.

Another purpose is to provide an improved rotary motor.

Another purpose is to provide a rotary motor which is applicable in its application of power.

Another purpose is to provide a rotary motor in which a plurality of driving capacities are permitted.

Another purpose is to provide an improved motor rotor including a plurality of vanes.

Another purpose is to provide an improved motor rotor having vanes operating in zones of different radial dimensions.

Another purpose is to provide an improved rotor and housing in a fluid motor.

Another purpose is to provide an improved housing and valving assembly for such a motor.

Other purposes will appear from time to time in the course of the specification and claims.

I illustrate the invention more or less diagrammatically in the accompanying drawings, wherein:

Fig. 2 is a transverse section through my motor;

Fig. 3 is a partial section illustrating a different position of one of the vanes;

Fig. 4 is a section on the line 4—4 of Fig. 2;

Fig. 5 is a section on an enlarged scale on the line 5—5 of Fig. 1;

Fig. 6 is a section on an enlarged scale on the line 6—6 of Fig. 1;

Figure 11:
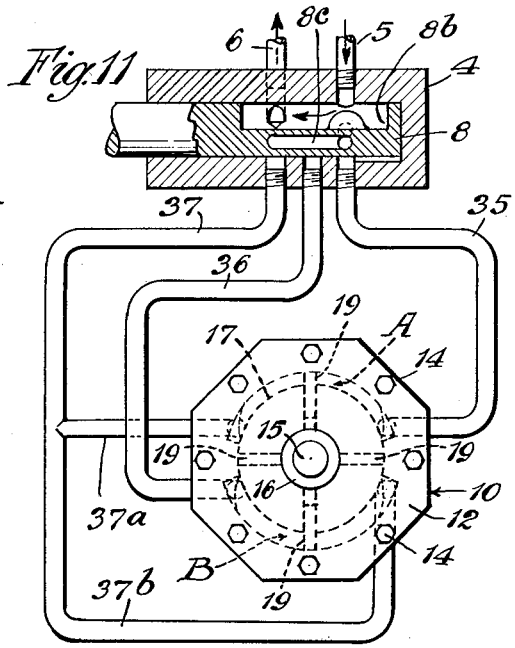

Fig. 11 diagrammatically illustrates the parts in breaking position; and

Figure 12:
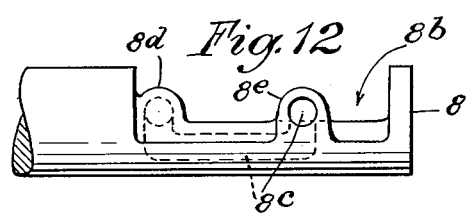

Fig. 12 is a top plan view of a valve stem usable in my invention.

Figure 1:
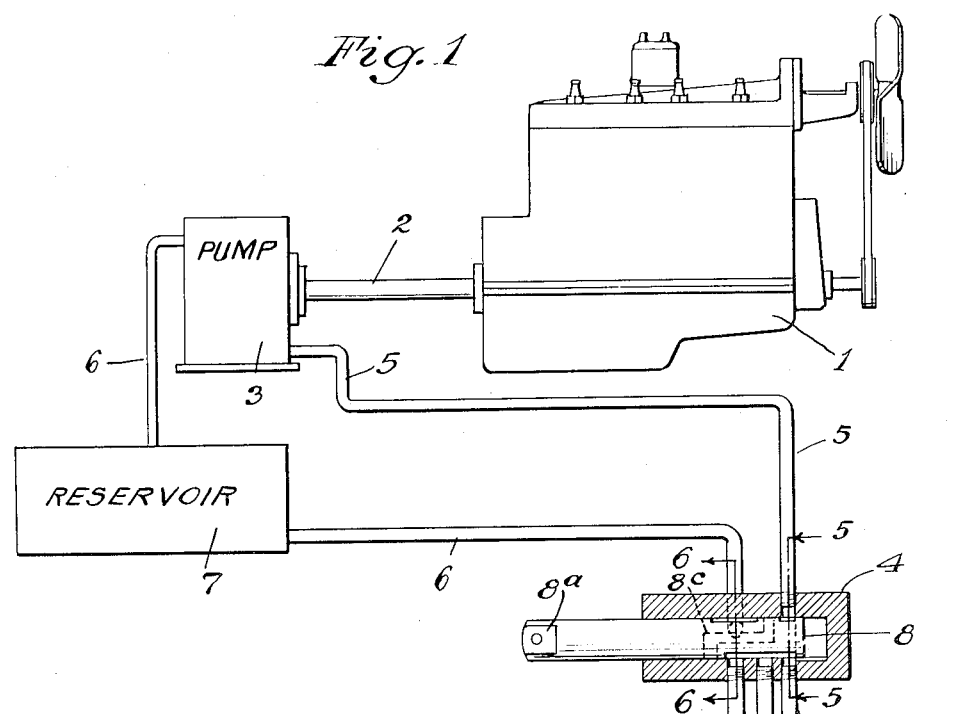
Fig. 1 is a diagrammatic assembly generally illustrating my motor and control means therefor.
Figure 7:
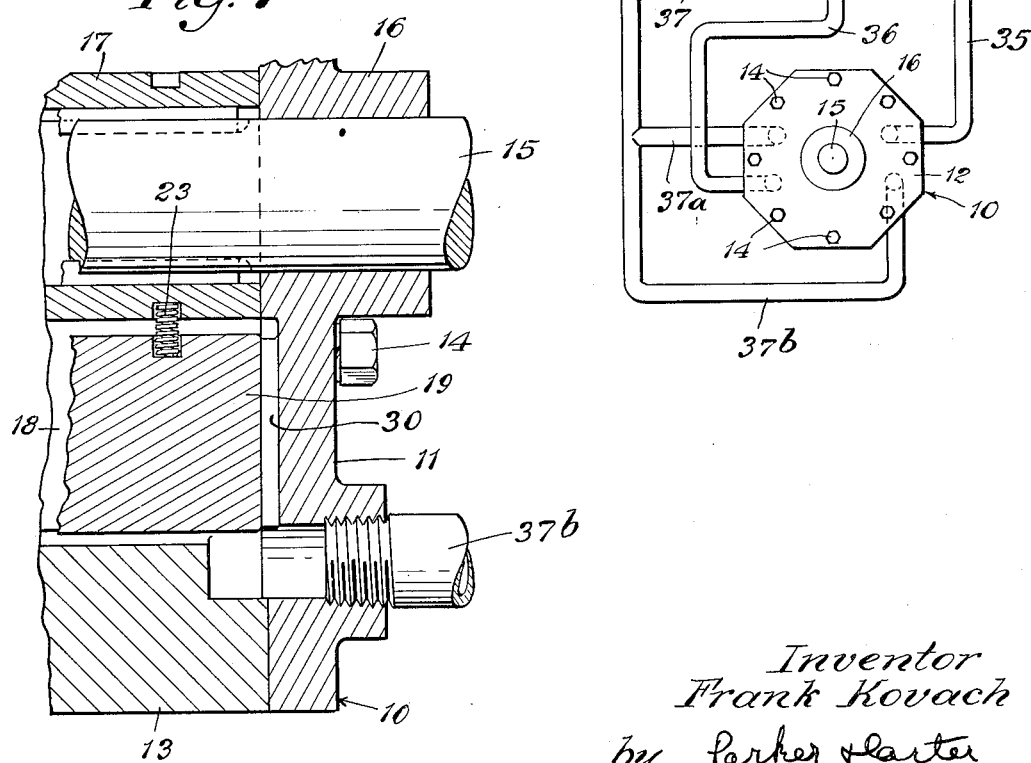
Fig. 7 is a section on the line 7—7 of Fig. 3.

Referring to the drawings, Fig. 1 diagrammatically illustrates the parts in idling or free position. It includes, however, the pump reservoir and pump motor means omitted from Figs. 8 to 11. Considering Fig. 1, 1 indicates any suitable motor means which, through a shaft 2, drives the diagrammatically illustrated pump 3 which is in circuit with the valve housing 4 by means of ducts 5 and 6. A liquid reservoir 7 is indicated between the ends of the duct 6. It will be understood that the pump 3, when the motor 1 is operating is effective to deliver liquid through the delivery duct 5 to the interior of the valve casing 4. 6 constitutes the return duct from the valve casing 4 to the reservoir 7 and to the intake side of the pump 3. 8 generally indicates a valve plunger which will be later described in detail. It includes, however, an externally extending stem 8a which may be actuated through any suitable control means or handle or assembly not herein shown. It will be understood that it is mounted for both sliding and rotary movement, as will later appear.

The motor housing is generally indicated at 10, for example, in Figs. 2, 3 and 4. It includes side walls 11, 12 and a circumferential wall 13, the side walls and the circumferential wall being held together by any suitable means for example the screws 14. It will be understood that any suitable sealing means or formation may be employed to the end that the motor housing thus formed is liquid-tight.

Rotatable within the housing is the motor shaft 15. It may, for example, be the drive shaft of a car or any suitable power transmitting or power delivering device, since the invention herein described is capable of a wide variety of applications. As shown in Fig. 4, the shaft 15 is rotatable in any suitable hubs or bearings 16 in the end walls 11 and 12. It will be understood that any suitable anti-frictional and sealing means may be employed, they being omitted from the drawings since they do not of themselves form part of the present invention. Keyed or otherwise secured to the shaft 15 is the rotor body 17. This body is provided with a plurality of generally radial vanes 19. These vanes, as the rotor body 17 rotates, engage generally radial walled recesses A and B in the circumferential pump housing wall 13. It will be observed that these recesses are of different radial depth and that they terminate at their ends in inclined wall faces 20. The end walls 20 of the recesses A and B are connected by arcuate surfaces 21, 22, which conform to and closely approach the cylindrical outer surface of the rotor body 17. Any suitable spring means 23 may be employed normally to urge the vanes 19 radially outwardly in their slots 18. The yielding means or springs 23 are of such proportion length and strength as to be compressed when the vanes, as shown in Fig. 3, ride up over the inclined surfaces 20 and seat against the intermediate arcuate surfaces 21 or 22. Since the spring alone would not be sufficient to maintain the vanes 19 in outwardly sealed or firmly engaging position, I provide a system of ducts in communication with the interiors of the recesses A and B, as the rotor rotates.

In connection with each of the slots 18, I illustrate pressure inlet ducts or passages 25. I illustrate two in connection with each slot 18, one having its intake end at each side of the vane which rides in the slot. I provide at the intake end of each such duct 25 a check valve structure generally indicated as 26 which may include an intake port ball or equivalent member and a spring. Thus fluid under pressure may be admitted from the interior of the recess A or B into the inner end of the slot, with the result that fluid pressure supplements the spring 23 or permits the spring 23 to operate under balanced fluid pressure conditions. To permit the escape of the fluid which passes the above described check valve structures, I illustrate escape or return slots 30 shown as formed in the end wall 11.

Figure 8:
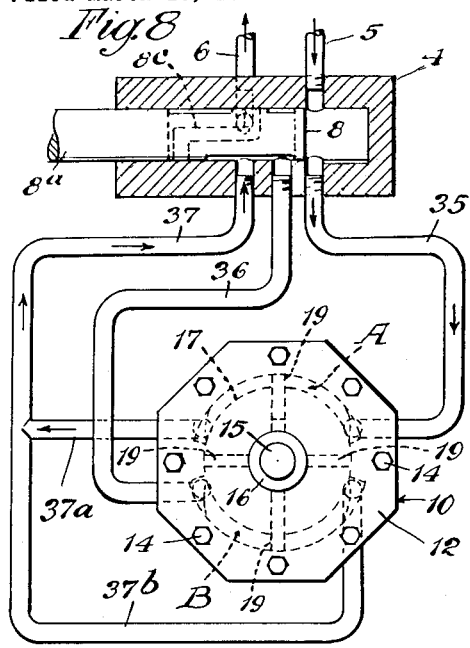
Fig. 8 is a diagrammatic illustration of one stage of operation.
Figure 9:
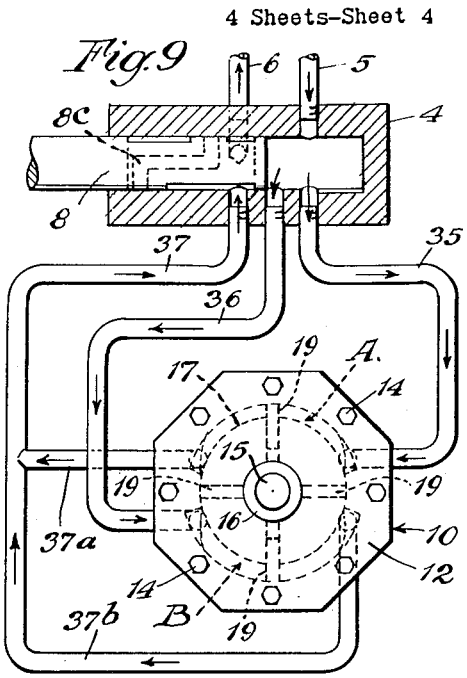
Fig. 9 is a diagrammatic illustration of another stage of the operation.

In connecting the above described motor assembly to the control valve, I illustrate 3 ducts, one of which is divided. Referring, for example, to Fig. 1, a duct 35 extends from the right hand end of the valve housing 4, referring to the position of the parts as shown in Fig. 1. A second duct 36 extends from an intermediate point in the valve housing 4 and a third duct 37, having separate branches 37a, and 37b, extends from the left end of the valve housing 4. Let us assume high-speed operation with a smaller power requirement. The valve 8 is so set as to connect the duct 35 with the pressure side of the motor. This is the position in which the parts are illustrated in Fig. 8. As a result, pressure is admitted to the recess A at the top of Fig. 2, and is also admitted by one of the passages 30 to the inner end of the slot in which the upper right hand vane 19, referring to the position of parts of Fig. 2, is positioned. The appropriate check valve prevents escape through the left duct 25 and the result of the pressure behind the vane 19 is to force it and thus the rotor to rotate in a counterclockwise direction. As additional vanes enters the recess A, they are subjected to pressure through the duct 35, while the vanes which have already been subjected to such pressure ride up over the end inclined face 20 of the recess A and ride out over the arcuate or partly cylindrical surfaces 21. As long as the valve member 8 is in the position in which it is shown in Fig. 8, this action will continue. The recess B is discontinued from the pressure system and performs no function. The liquid pushed ahead of the vanes escapes through the return duct 37a and thus back to the reservoir 7 and the suction side of the motor. As the vanes ride up over the inclined surface 20 at the left end of the recess A the fluid is exhausted through one of the passages 30. The vanes are so spaced that one of the vanes is always under the driving pressure of the liquid and riding on the arcuate or partly cylindrical outer surface of the recess A. Referring to Fig. 9 the valve member 8 has been moved to a position effective to admit the pressure of the motor to duct 36 as well as to duct 35. The result is that the interior of the recess B is similarly subjected to fluid pressure and the operation on the vanes is the same as in the case of the recess A. In other words, both recesses are operating at the same time and two vanes are always under the propulsive pressure of the fluid. Since the radial depth of the recess B is greater than the radial depth of the recess A, the result of the admission of like pressure to the recess B is a greater torque delivery than results from the application of pressure to the interior of the recess A. However, the two recesses cooperate when the parts are in the position of Fig. 9, whereby a maximum torque delivery is obtained. It will be understood, of course, that the fork 37b of the relief or return passage 37 performs the same function for the recess B as is performed by the passage 37a for the recess A.

Whereas I do not illustrate a specific duct arrangement for that purpose, it will be understood that I might so arrange my ducts and valve arrangements as to be able to employ the recess B without employing the recess A, in such event having a 3-speed motor. It is within the scope of my invention to provide a multi-speed motor in which any one or any combination of multiple recesses may be employed for flexible power delivery.

Figure 10:
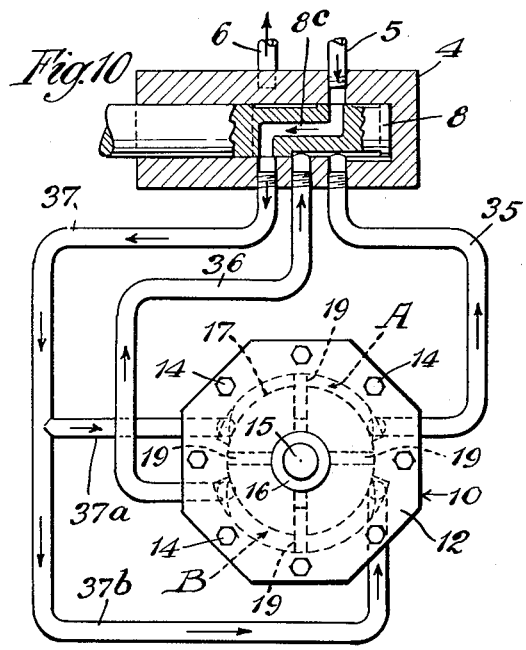
Fig. 10 is a diagrammatic illustration of the reverse portion of the motor.

Whereas I do not wish to be limited to any particular valve structure, I will now describe in greater detail the valve structure I employ to maintain and obtain the above described fluid flow. The valve member 8 is shown as being cut away, as shown in 8b in Fig. 12. It also includes a by-pass duct 8c. The ends of the duct 8c are surrounded by bosses 8d and 8e so that they can be brought in line with the inlet duct 5 to connect it to the passage 37 to convert it from an exhaust passage to a pressure delivery passage. This is done, as in Fig. 10, when it is desired to rotate the motor in a reverse direction. With the parts in position as shown in Fig. 10, power or fluid pressure is delivered through the duct or passage 37 and its branches 37a and 37b to the left end of the recess A and to the right end of the recess B, referring to the position of the parts as shown in Fig. 2. The result is a drive of the rotor in an opposite direction. It will be noted that the proportioning of the recesses, the contours of the surfaces 20 and the arrangement of the slots 18, the ducts 25 and the passages or channels 30 is such that the rotor operates as well in one direction as in the other. It should also be noted that in either direction of rotation pressure is initially delivered to the inner portion of the slot 18 of each vane which passes down one of the slopes 20. As soon as the slot has gone far enough to be out of contact with the inner end of the passage or recess 30, pressure is used, equalized through the check valve in front of the vane, the check valve behind the vane preventing any escape of the liquid until the passage 30 at the passage end of the recess is reached.

When the parts are in the position of Fig. 11, the valve body 8 is rotated into a locking position which prevents any delivery of fluid to or return from the rotor but which does establish a return circuit as shown in Fig. 11 to the reservoir 7. It will also be noted that when the parts are in the position of Fig. 1, the rotor is free to rotate, but pressure is not being supplied to it.

It will be realized that whereas I have described and shown a practical and operative device, nevertheless many changes may be made in size, shape, number, arrangement and disposition of parts without departing from the spirit of my invention. I therefore wish my drawings to be taken as in a broad sense illustrative or diagrammatic rather than as limiting me to my specific showing herein. This is true to the number of vanes which may be widely varied and the number of recesses which may be varied, it being understood that a variety of different valve mechanisms may be employed as necessary.

The use and operation of the invention are as follows:

I provide a fluid motor or a fluid power transmitting device of structural simplicity and flexibility of control. The rotor and valve are so arranged and related that, regardless of the performance or function of the motor, the discharge from the pump is never restricted. Hence, the engine can be kept running under any conditions or circumstances. It should be kept in mind that my structure multiplies the torque of the engine or motor which drives the pump. For example, with reference to the drawings, the pump shown at 3 in Fig. 1 may be positive in displacement.

Let us assume that its discharge is at the rate of 5 cubic inches per revolution, and that the volume necessary to revolve the above-described hydraulic motor once is 100 cubic inches. I would have a ratio of 20:1, the same as if I employed a gear of five teeth driving a gear with one hundred teeth. And whatever torque the engine is exerting in either of the above-mentioned cases, the torque will be multiplied at the same ratio. If more torque is desired than can be obtained by the recess or cavity A, my assembly is so arranged that the other recess or cavity B can be brought into play to increase the torque. It is true, of course, that the speed of the rotor is decreased, since the incoming fluid is taken up by two cavities instead of by one. The rotation or the torque exerted is unvarying, with whatever cavity or combination of cavities the motor may be operating, but the torque does vary as the pressure varies.

Let us consider the situation when the cavity A is working alone and the vane 19 is still on the inclined end 20 of the cavity A, and that the rotor is turning anticlockwise. The fluid pressure is free to pass the vane which is still on the incline, and pressure is brought to bear on the vane which is seated on the concentric wall of the cavity or recess A. The reason that the fluid can pass the vane 19 while it is on the inclined surface 20 is that the inclined surface is not as wide as the vane. When the vane 19 becomes seated on the concentric part of the outer wall of the cavity A it then takes over its propulsive function, since it is now receiving pressure. There is always at least one of the vanes which is receiving full pressure, and the power delivery is uninterrupted. The vanes are so spaced that the same area is exposed to full pressure at all times. Thus a complete revolution of unvaried torque is possible in recess A, and while, at the same time, it is in substantially positive ratio with the engine.

In the structure herein shown the number of vanes is always twice the number of arcuate surfaces. As long as this relationship is maintained, any number of stages can be made within the practical limits of the mechanism, and any or all, or any combination of recesses or cavities may be employed to generate a uniform torque starting from standstill against a load on any degree of the circle.

I claim:

1. In a hydraulic power-transmitting device, a rotor including a generally cylindrical body, a housing surrounding the body of the rotor, the housing having an inner wall, portions of which conform closely to the surface of the rotor body, and at least two portions of which, separated by such conforming portions, constitute cavities defined by inner surfaces of the housing which are spaced radially outwardly from the surface of the rotor body, each cavity having a different radial depth, said body having a plurality of equally spaced vanes mounted therein for generally radial movement, there being at least two vanes for each cavity, each vane being slidably positioned in a guiding slot in the cylindrical body, a by-pass passage extending from the surface of the body at each side of the vane to an inner portion of the slot behind each vane and establishing communication between the cavities and slots, a spring positioned in each slot for biasing each vane outwardly into contact with the inner surfaces of the housing during rotation of said body irrespective of the pressure in said slots behind said vanes, inlet and exhaust passages positioned in each end of each cavity and in communication therewith, said housing having a pressure relief passage for each end of each cavity, each relief passage extending inwardly to a point circumferentially aligned with the inner end of each slot and communicating with one of said inlet and exhaust passages, each relief passage communicating with one of said slots when the slot passes the end of the cavity.

2. In a hydraulic power-transmitting device, a rotor including a generally cylindrical body, a housing surrounding the body of the rotor, the housing having an inner wall, portions of which conform closely to the surface of the rotor body, and at least two portions of which, separated by such conforming portions, constitute cavities defined by inner surfaces of the housing which are spaced radially outwardly from the surface of the rotor body, each cavity having a different radial depth, said body having a plurality of equally spaced vanes mounted therein for generally radial movement, there being at least two vanes for each cavity, each vane being slidably positioned in a guiding slot in the cylindrical body, a by-pass passage extending from the surface of the body at each side of the vane to an inner portion of the slot behind each vane and establishing communication between the cavities and slots, a spring positioned in each slot for biasing each vane outwardly into contact with the inner surfaces of the housing during rotation of said body irrespective of the pressure in said slots behind said vanes, inlet and exhaust passages positioned in each end of each cavity and in communication therewith, said housing having a pressure relief passage for each end of each cavity, each relief passage extending inwardly to a point circumferentially aligned with the inner end of each slot and communicating with one of said inlet and exhaust passages, each relief passage communicating with one of said slots when the slot passes the end of the cavity, valve means for directing hydraulic fluid to the passage at one end of one cavity while exhausting hydraulic fluid from the passage at the other end of said cavity and including means for preventing the flow of hydraulic fluid to and from said passages.

3. The structure of claim 2 wherein said passages communicate with a bore in a valve body included in said valve means, said valve body having a fluid inlet passage and a fluid exhaust passage and a valve plunger slidably mounted in said bore for uncovering a selected conduit.

4. A fluid power transmitting device including a housing having a plurality of spaced cavities therein, a rotor in said body having a plurality of vanes extending radially outwardly in said cavities, a valve body having a bore therein forming a fluid chamber, spaced passageways communicating with said chamber for admitting and exhausting hydraulic fluid under pressure therefrom, a valve plunger slidably mounted in said bore, a plurality of pressure passages communicating with one end of each cavity and communicating with said chamber at spaced points along the axis of said chamber, exhaust passages communicating with the other ends of said cavities and said chamber at a point spaced from the points of communication of the other passages, said valve plunger being movable between a first position uncovering a selected inlet passage to the chamber and a second position uncovering a plurality of said inlet passages, the end face of said plunger being exposed at all times to the pressure in said chamber whereby a build-up in pressure in said chamber uncovers an additional inlet passage.

5. The structure of claim 4 wherein said valve plunger is mounted for rotational movement and linear movement within the bore of said valve housing, said valve plunger having a reduced portion intermediate its ends to allow communication between the inlet and exhaust passages when the outer surface of said plunger is rotated to a position closing the inlet and exhaust passages leading to said fluid power transmitting device.

References Cited in the file of this patent

UNITED STATES PATENTS

| Number | Name | Date |
|---|---|---|
| 146,010 | Manley | Dec. 30, 1873 |
| 270,160 | Wade et al. | Jan. 2, 1883 |
| 276,857 | Moffett | May 1, 1883 |
| 577,304 | June | Feb. 16, 1897 |
| 825,374 | Black | July 10, 1906 |
| 2,056,910 | Schauer | Oct. 6, 1936 |
| 2,453,309 | Douglas | Nov. 9, 1948 |

FOREIGN PATENTS

| Number | Country | Date |
|---|---|---|
| 924,507 | France | Mar. 10, 1947 |